Figure 1:
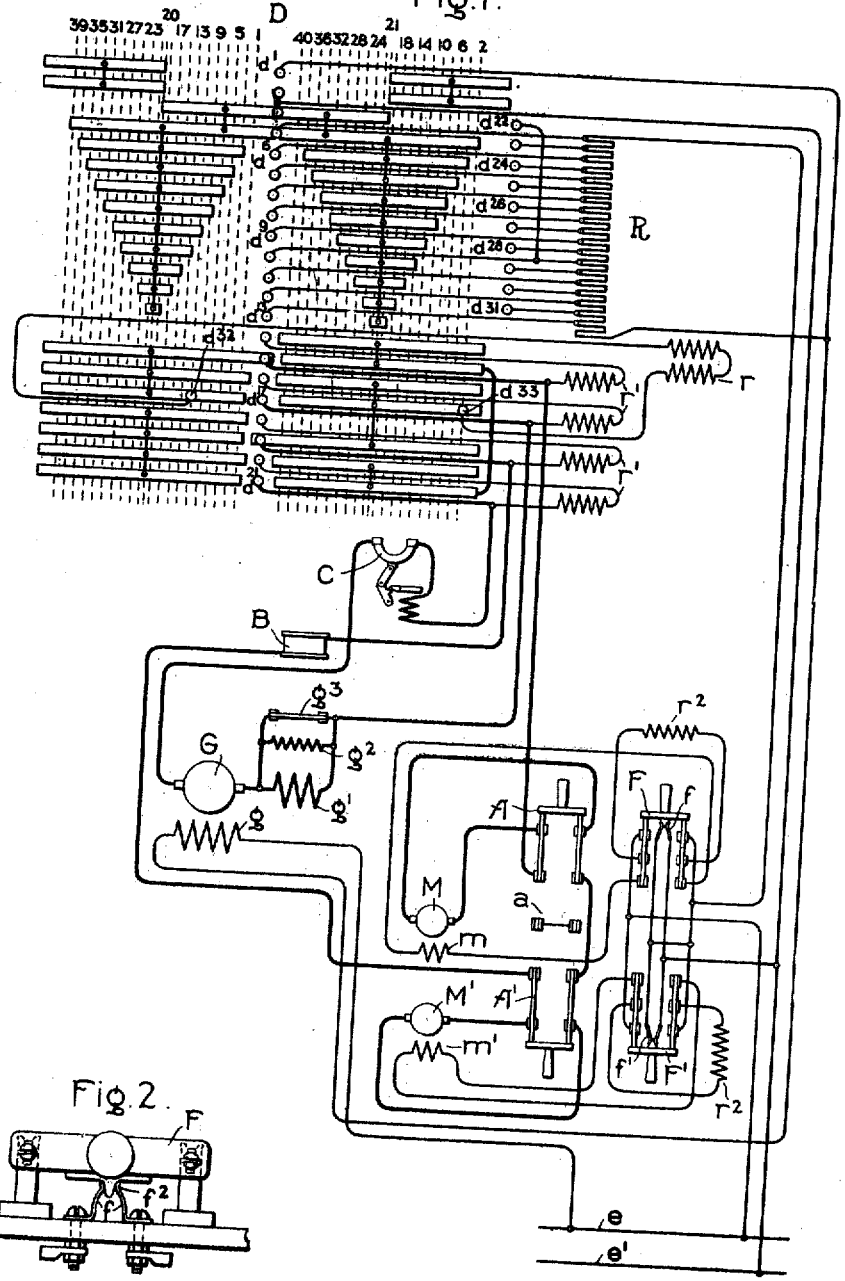

No. 829,144.　　　　　　　　　　　　　　　PATENTED AUG. 21, 1906.
M. W. DAY.
ELECTRIC MOTOR CONTROL.
APPLICATION FILED JUNE 27, 1904.

Witnesses.

Inventor.
Maxwell W. Day.
by Albert G. Davis
Atty

UNITED STATES PATENT OFFICE.

MAXWELL W. DAY, OF SCHENECTADY, NEW YORK, ASSIGNOR TO GENERAL ELECTRIC COMPANY, A CORPORATION OF NEW YORK.

ELECTRIC-MOTOR CONTROL.

No. 829,144.     Specification of Letters Patent.     Patented Aug. 21, 1906.

Application filed June 27, 1904. Serial No. 214,245.

*To all whom it may concern:*

Be it known that I, MAXWELL W. DAY, a citizen of the United States, residing at Schenectady, county of Schenectady, State of New York, have invented certain new and useful Improvements in Electric-Motor Control, of which the following is a specification.

My invention relates to the control of electric motors; and its object is to provide a novel arrangement of cut-out switches for a plurality of motors normally connected in series and controlled in speed by a single controlling-switch.

A system that is frequently employed for the control of motors where speed control by fine gradations and over wide ranges is desired is known as the "Ward Leonard" system. In this system the motor to be controlled is supplied from a generator which is driven by any suitable source of power. The fields of both motor and generator are separately excited, and the field strength of the generator is controlled. In order to obtain a greater range of speed than the Leonard system gives, it has been customary heretofore to vary the strength of the motor-field as well as that of the generator. In this manner an efficient speed control over wide ranges and by small steps may be obtained. Where a plurality of motors are used, the motor-armatures are ordinarily connected in parallel to the generator and the fields simultaneously controlled. When the parallel connections are employed, however, the current in the armature-circuit must be large and the drop in the leads and connections is often excessive. By connecting the motors in series the current in the armature-circuit is reduced for a given torque, and, furthermore, the minimum speed at which the motors may be satisfactorily operated is decreased. When two motors are permanently connected in series, however, and one motor becomes disabled from any cause, it is necessary to cut it out of circuit and operate by means of the remaining motor. When this is done, the voltage impressed upon the remaining motor is twice as great as when the two motors were connected in series. The motor speed with the same field strength is consequently doubled. Thus if the higher speeds with the motors in series were obtained by weakening the fields it is essential to prevent such weakening when operating with a single motor only.

By my invention I provide a novel arrangement of cut-out switches such that when one motor is cut out of circuit the speed-controlling switch is prevented from weakening the field of the remaining motor.

Although I shall describe my invention as applied to the motors controlled by the Ward Leonard system, modified to include means for controlling the field strength of the motors, it will be understood that my invention is not limited to motors controlled by this particular system, but is applicable to the control of any motors which are normally connected in series and have their field strengths varied to obtain speed variation.

My invention will best be understood by reference to the accompanying drawings, in which—

Figure 2:
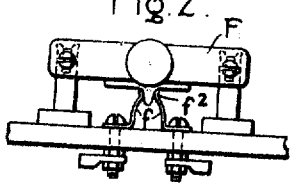

Figure 1 shows diagrammatically my invention applied to two motors controlled in accordance with the Ward Leonard system, and Fig. 2 shows a detail of a cut-out switch.

In the drawings, G represents a generator which is driven from any suitable source of power and which supplies current to the armatures of the motors M M'. The generator G is shown as a compound-wound machine with the series field $g'$, which may or may not be provided with the shunt $g^2$ and the short-circuiting switch $g^3$, and the main field $g$, which is separately excited from any suitable source, as indicated by the mains $e$ $e'$. The two motor-fields $m$ $m'$ are also separately excited and in the drawings are shown excited from the same source.

D represents the main controlling-switch.

B represents a blow-out coil for the controller.

C represents a circuit-breaker in the armature-circuit.

A A' represent cut-out switches for the motor-armatures, and F F' cut-out switches for the motor-field.

The controlling-switch D is arranged to open and close the armature-circuit and to include variable portions of the resistance R in series with the generator-field or with the motor-fields. The controlling-switch D is also arranged with two sets of stationary contacts connected to the resistance R and displaced by one hundred and eighty degrees, so that the switch may be rotated in either direction for the opposite directions of rotation of the motor and at the same time permit the use of all the contact-fingers. In the off position of switch D, as shown, the motor-armatures M M' are connected in a closed circuit in series with each other and with the resistance r, while the fields are connected with full strength to the source of excitation e e'. These circuits may be traced as follows: from the upper terminal of resistance r to contact $d^{32}$, contact $d^{15}$, switch A, motor-armature M', switch A, switch A', mq' r-armature M', switch A', blow-out coil B, contact $d^{19}$, contact $d^{33}$, lower terminal of resistance r. The field-circuit is from line e, switches F and F', and fields m and m' in parallel, contact $d^4$, contact $d^3$, to line e'. This connection of the motors, which is for braking, so as to bring the motors to rest immediately upon bringing switch D to its open position, is intended for use in the control of any motor-operated mechanism, such as a turret on a battle-ship, which should be stopped at once upon cutting off the current from the motors. When switch D is moved in one direction or the other to start the motors, the armature-braking circuit is broken either at contact $d^{15}$ or contact $d^{19}$, depending upon the direction of movement of switch D. Assume that the movable contacts of switch D are moved toward the left to start the motors with a given direction of rotation. When the stationary contact-fingers engage the movable contacts on the dotted line 40, the following circuits are closed: from the left-hand brush of generator G, through circuit-breaker C, contact $d^{21}$ to contact $d^{16}$, switch A, motor-armature M, switch A, switch A', motor-armature M', switch A', blow-out coil B, contact $d^{19}$, contact $d^{17}$, through series field g', to right-hand brush of generator G. The two motor-armatures are thus connected in series with the armature of generator G, and this connection is maintained throughout the further movement of the controlling-switch. The circuit of the motor-fields has already been traced. The circuit of the generator-field is as follows: from line e, to the generator-field g, to lower terminal of resistance R, through the entire resistance, to contact-finger $d^4$, to contact-finger $d^3$, and to line-wire e'. The generator-field is thus connected to the source of excitation with all the resistance R in series therewith. As the motion of the movable contacts of switch D toward the right is continued a section of resistance R is short-circuited by means of contact-finger $d^{23}$. When the third position is reached, another section is short-circuited by contact-finger $d^5$. This short-circuiting of resistance R by sections is continued by the fingers of the two groups alternately until in position 21 the resistance R is entirely short-circuited and the generator G is operating with full field strength.

In passing from position 21 to position 20 a connection is established between $d'$ and $d^2$, thereby connecting the left-hand terminal of generator-field g to line-wire e' independently of the resistance R. At the same time the connection between fingers $d^3$ and $d^4$ is broken, thereby breaking the connection between line-wire e' and the left-hand terminals of motor-fields m and m'. A second connection between these field-terminals and line-wire e', however, remains through the resistance R, and since this resistance is entirely short-circuited in position 21 the motor-fields m and m' still have full strength. As the movement is continued into position 18 the short circuit is removed from one section of resistance R by contact-finger $d^{13}$. In the next position a short circuit is removed from a second section by contact-finger $d^{31}$. Thus the several sections are consecutively included in series with the motor-fields. The motor-fields are thereby weakened and the speed of the motors further increased. This weakening of the fields is limited by the contact $d^{22}$, which serves to maintain a portion of resistance R short-circuited through the remaining positions of switch D. In this way the fields are maintained with sufficient strength for proper operation. It is evident, however, that if one of the motors is disabled and it is necessary to cut it out of circuit the armature of the other motor will be subjected to the full generator voltage, and consequently its speed with full field will be double its speed when the two motors are connected in series with full fields. Therefore the controlling-switch should be prevented from weakening the field of the remaining motor after one is cut out. I accomplish this by the arrangement of the cut-out switches. Assume that one of the motors—as, for instance, M'—is injured. To cut it out, switch A' is thrown upward into engagement with the contacts a and switch F' is opened. It will be seen that the armature M' is simply cut out of circuit, the circuit of the remaining motor-armature being completed through the contacts a. The field m' is also cut out of circuit by the opening of switch F'. The opening of this latter switch permits the two spring-clips $f''$ to close. The arrangement of these spring-clips, which is indicated diagrammatically in Fig. 1, is shown in detail in Fig. 2. When the switch F is closed, the insulating-wedge $f^2$, carried by the handle of the switch, is pressed between the spring-clips f, holding them apart. When switch F is opened, the clips f automatically spring together. This closing of the clips connects line-wire e' directly to the left-hand terminals of the motor-fields m and m'. Since the right-hand terminals of the fields are connected through switches F and F' directly to line-wire e, the remaining motor-field after one motor is cut out must always be at full strength. The resistance R and the controlling-switch D are consequently short-circuited by the spring-clips as far as the motor-field circuit is concerned. The resistances $r^2$ are merely discharge resistances for the fields $m\ m'$, and the resistances $r'$ are arranged to be inserted in the armature-circuit to reduce the current before opening the armature-circuit.

I have shown a complete system adapted for controlling a turret operated by a plurality of motors on the Ward Leonard system, and I have shown and described, for the sake of completeness, many features which form no part of my invention and which may be omitted or altered, as desired. Furthermore, the form of interlock between the cut-out switches and the speed-controlling switch may be varied without departing from the spirit of my invention. Accordingly I aim in the appended claims to cover all such modifications which are within the scope of my invention.

What I claim as new, and desire to secure by Letters Patent of the United States, is—

1. In combination, two motors connected in series, a resistance adapted for connection in the field-circuit of said motors, a speed-controlling switch adapted to connect varying portions of said resistance in the field-circuit, cut-out switches for said motors, and means for preventing said speed-controlling switch from connecting resistance in the field-circuit when one motor is cut out.

2. In combination, two motors connected in series, a speed-controlling switch adapted to vary the field strength of said motors, cut-out switches, and means for preventing said speed-controlling switch from weakening the field of one motor when the other motor is cut out.

3. In combination, two motors connected in series, a speed-controlling switch adapted to vary the field strength of said motors, cut-out switches, and means operatively connected to a cut-out switch for preventing said speed-controlling switch from weakening the field of one motor when the other motor is cut out.

4. In combination, two motors connected in series, a resistance in the field-circuit of said motors, a speed-controlling switch adapted to short-circuit variable portions of said resistance, cut-out switches, and means independent of said speed-controlling switch for short-circuiting said resistance when one motor is cut out.

5. In combination, two motors connected in series, a resistance in the field-circuit of said motors, a speed-controlling switch adapted to short-circuit variable portions of said resistance, cut-out switches, and means operatively connected to a cut-out switch for short-circuiting said resistance when one motor is cut out.

6. In combination, two separately-excited motors connected in series, a resistance in the field-circuit of said motors, a speed-controlling switch adapted to short-circuit variable portions of said resistance, cut-out switches and means for connecting the field of one motor directly to the source of excitation independently of said resistance when the other motor is cut out.

7. In combination, a separately-excited generator, two separately-excited motors connected in series to said generator, a field resistance, a speed-controlling switch adapted to connect variable portions of said resistance in the field-circuit of the generator or of the motors, cut-out switches, and means for preventing said speed-controlling switch from connecting said resistance in the circuit of one motor-field when the other motor is cut out.

8. In combination, a separately-excited generator, two separately-excited motors connected in series to said generator, a field resistance, a speed-controlling switch adapted to connect variable portions of said resistance in the field-circuit of the generator or of the motors, cut-out switches and means operatively connected to a cut-out switch for connecting the field of one motor directly to the source of excitation independently of said speed-controlling switch when the other motor is cut out.

In witness whereof I hereunto set my hand this 25th day of June, 1904.

MAXWELL W. DAY.

Witnesses:
BENJAMIN B. HULL,
HELEN ORFORD.